March 21, 1950   E. A. BINNEY   2,501,307
SUSPENSION OF AXLE-HUNG ELECTRIC TRACTION MOTORS
Filed May 13, 1947
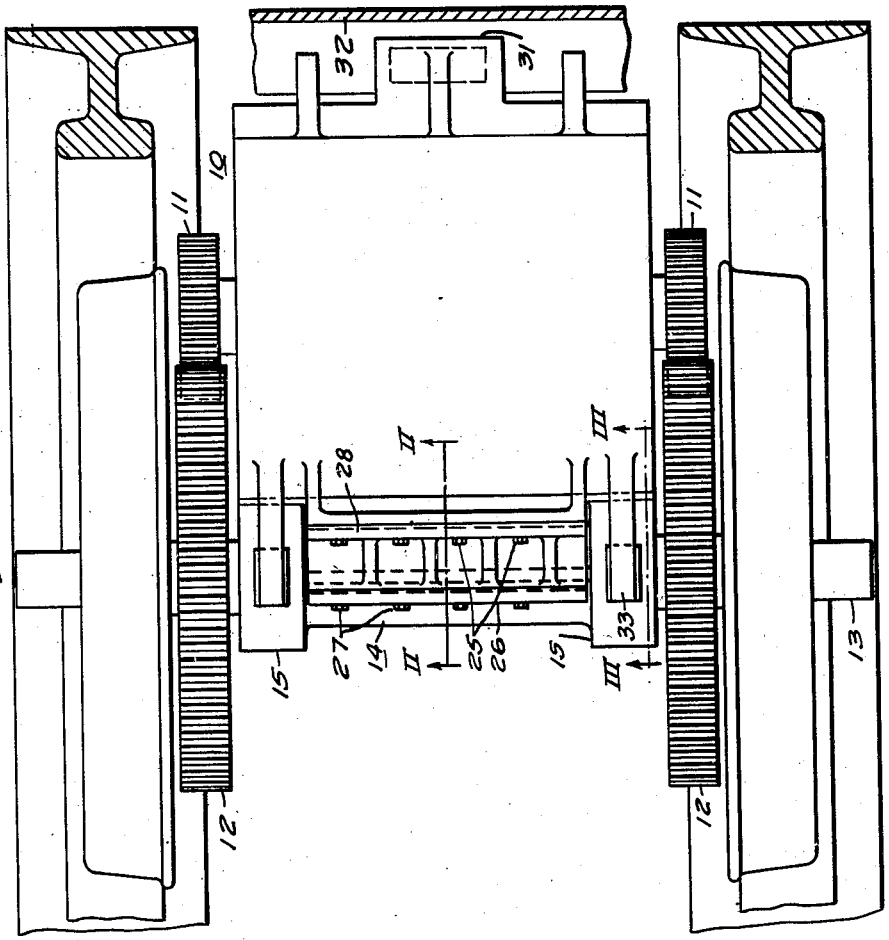
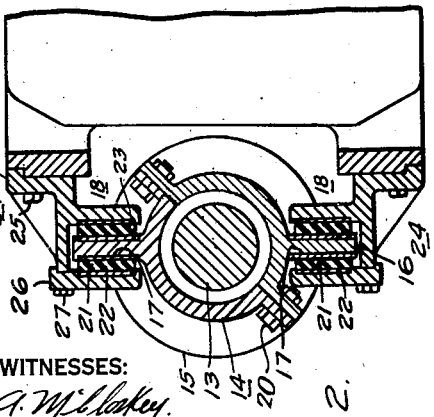
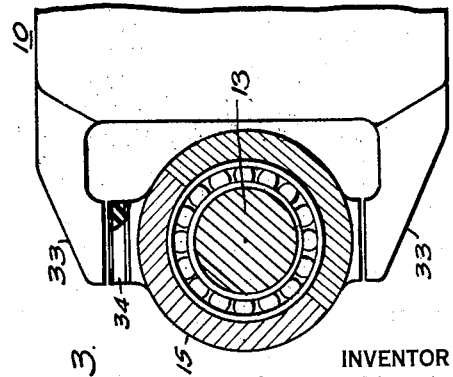
WITNESSES:
INVENTOR
Eric A. Binney.
BY
ATTORNEY Patented Mar. 21, 1950

2,501,307

UNITED STATES PATENT OFFICE 2,501,307

SUSPENSION OF AXLE-HUNG ELECTRIC TRACTION MOTORS

Eric Alton Binney, Yorkshire, England, assignor to The English Electric Company, Limited, London, England, a British company Application May 13, 1947, Serial No. 747,783
In Great Britain May 21, 1946

4 Claims. (Cl. 105—136)

My invention relates, generally, to motor suspensions and, more particularly, to the suspension of axle-hung traction motors for electrically-propelled vehicles.

Heretofore, it has usually been the practice to suspend one side of the motor directly on suspension bearings journaled on the vehicle axle, a nose projecting on the other side of the motor being resiliently supported on a transverse bar forming part of the vehicle truck or undercarriage.

This prior arrangement has the disadvantage that approximately half the total weight of the motor constitutes a dead load on the vehicle axle so that any shock imparted to the vehicle wheels is transmitted to the motor with consequent deleterious effects on the motor, the transmission system, in general, and on the track.

An object of my invention, generally stated, is to provide a motor suspension which shall overcome the foregoing disadvantage, be simple and efficient in operation and which may be economically manufactured and installed.

A more specific object of my invention is to provide for resiliently supporting an electric motor on a vehicle axle.

Other objects of my invention will be explained fully hereinafter or will be apparent to those skilled in the art.

In accordance with one embodiment of my invention, the traction motor for a vehicle is resiliently supported on the vehicle axle by means including at least one layer of rubber so interposed between a part of the motor frame and a part of the suspension bearing housing that the weight of the motor stresses the rubber primarily in shear.

The motor may have a single pinion at one end thereof meshing with a single gear wheel on the vehicle axle, but preferably it will have a pinion at each end, each meshing with a separate gear wheel. In the latter case, as each gear wheel carries only approximately half the total load, the gear wheels may each be of approximately half the width of that required for a single gear wheel.

Where only one pinion is utilized, the reaction on the motor due to the gear thrust will cause a diagonal tilting of the motor, and it is preferable that the gear wheels should be of a resilient self-aligning type in order to insure correct meshing. Where two sets of gears are utilized, it is also preferable to use gear wheels of the resilient type so that the load will be substantially evenly divided between the two sets of gears.

For a better understanding of the nature and objects of my invention, reference may be had to the following detailed description, taken in conjunction with the accompanying drawing, in which:

Figure 1 is a view, in plan, of a portion of a railway vehicle structure embodying the principal features of my invention; and Figs. 2 and 3 are enlarged sectional views taken along the lines II—II and III—III, respectively, of Fig. 1.

In the structure shown in the drawing, a traction motor 10 has a pinion 11 at each end thereof meshing with cooperating resilient gear wheels 12 on the vehicle axle 13. Two suspension bearings, preferably of the roller type, are provided for the motor. One bearing is disposed at each end of a cylindrical housing 14 which surrounds the axle and extends axially between the two gear wheels 12. The housing 14 has enlarged portions 15 at its ends for containing the suspension bearings. If desired, the housing and bearings may be split in order to facilitate their assembly on the axle. The two halves of the housing may be secured together by bolts 20 shown in Fig. 2.

As shown in Fig. 2, two vertical webs 16 extend axially along the housing 14 between the two bearings. One web projects from the top of the housing 14 and the other from the bottom. Each web 16 is provided with a plurality of pockets 17 at each side thereof to receive resilient units 18.

Each unit 18 comprises a layer of rubber or similar material 21 to each face of which is bonded a steel plate 22, one of which is adapted to fit into one of the pockets 17 in the web with the layer of rubber parallel to the side face of the web. The other plate 22 of each unit is adapted to fit into a pocket 23 in the inside wall of a channel member 24, the legs of which extend along each side of the vertical web 16 and parallel thereto.

Each of the channel members 24 may be bolted to the side of the frame of the motor 10 by bolts 25. If desired, the outer leg 26 of each channel member may be removable and attached to the channel member by bolts 27. Alternatively, the leg 28 of the channel member adjacent the side of the motor may be formed integrally therewith.

As shown most clearly in Fig. 1, the frame of the motor 10 is provided on the side opposite the axle with a nose 31. The nose 31 is resiliently supported in a manner well known in the art on a transverse member 32 forming part of the vehicle truck or undercarriage.

It will be seen that the motor 10 is connected to the suspension bearing housing 14 through the medium of a plurality of layers of rubber, or other material of a like nature, in such a manner that the motor is free to move relative to the vehicle axle in vertical and axial directions. The rubber in both cases is stressed primarily in shear, thereby affording a comparatively large amount of resilience in these directions. However, the rubber offers considerable resistance to compression and prevents excessive horizontal movement of the motor toward or away from the vehicle axle which would otherwise affect the correct meshing of the gears.

If desired, safety lugs 33 may be provided on the frame of the motor 10 in such a position that they project above and below the enlarged portions 15 of the suspension bearing housing so that the vertical movement of the motor will be limited to a safe amount. A layer of rubber 34 may be provided between the inner face of the upper lugs 33 and the top of the bearing housings 15 to prevent undue shock in the case of a failure of the resilient units. Alternatively, the bottom of the channel members 24 may be utilized to limit the vertical movement of the motor.

Where desired, the suspension bearings may be mounted in separate housings at each end of the axle. Each housing would then be provided with vertical webs and resilient units of the type previously described for a single housing.

It will be noted that the bearing housing 14, the resilient units 18 and the channel members 24 constitute a complete assembly journaled on the vehicle axle and bolted to the motor frame by the bolts 25. By removing the bolts 25, the motor may be readily removed from the axle without the necessity of disturbing the bearings, as is usually necessary where the motor is mounted directly on the bearings.

From the foregoing description, it is apparent that I have provided for resiliently supporting a traction motor on a vehicle axle in such a manner that the axle is relieved of the dead load of the motor, thereby preventing shock on the motor and the power transmission system.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A resilient suspension for an axle-hung motor comprising, a housing surrounding the axle, bearings disposed at the ends of the housing for rotatably mounting the axle in the housing, a web extending axially along the housing, a channel member secured to the motor frame and straddling said web, and resilient means so interposed between the web and the inside walls of the channel member that the housing can move both vertically and axially relative to the motor frame and the weight of the motor stresses the resilient means primarily in shear.

2. A resilient suspension for an axle-hung motor comprising, a housing surrounding the axle, bearings disposed at the ends of the housing for rotatably mounting the axle in the housing, webs extending axially along the housing on the upper and the lower sides thereof, channel members secured to the motor frame and straddling said webs, and a plurality of resilient units so interposed between the webs and the inside walls of the channel members that the housing can move both vertically and axially relative to the motor frame and the weight of the motor stresses said units primarily in shear.

3. A resilient suspension for an axle-hung motor comprising, a housing surrounding the axle, bearings disposed at the ends of the housing for rotatably mounting the axle in the housing, webs extending axially along the housing on the upper and the lower sides thereof, channel members secured to the motor frame and straddling said webs, and a plurality of resilient units so interposed between the webs and the inside walls of the channel members that the housing can move both vertically and axially relative to the motor frame and the weight of the motor stresses said units primarily in shear, said channel members having removable legs to facilitate the installing of said resilient units.

4. A resilient suspension for an axle-hung motor comprising, a housing surrounding the axle, bearings disposed at the ends of the housing for rotatably mounting the axle in the housing, webs extending axially along the housing on the upper and the lower sides thereof, said webs having a plurality of pockets in their sides, channel members secured to the motor frame and straddling said webs, the inside walls of said channel members having a plurality of pockets disposed in alinement with the pockets in the webs, and a plurality of resilient units so disposed in said pockets that the housing can move both vertically and axially relative to the motor frame and the weight of the motor stresses said units primarily in shear.

ERIC ALTON BINNEY.

REFERENCES CITED

The following references are of record in the file of this patent:

UNITED STATES PATENTS

| Number | Name | Date |
|---|---|---|
| Re. 18,457 | Lord | May 10, 1932 |
| 577,071 | Schmid | Feb. 16, 1897 |
| 585,371 | Woods | June 29, 1897 |
| 902,017 | Stowe | Oct. 27, 1908 |
| 1,055,598 | Balachowsky et al. | Mar. 11, 1913 |
| 1,937,581 | Lord | Dec. 5, 1933 |
| 1,939,848 | Haushalter | Dec. 19, 1933 |
| 2,023,856 | Sanders | Dec. 10, 1935 |
| 2,063,758 | Schjolin | Dec. 8, 1936 |
| 2,066,530 | Hoffman | Jan. 5, 1937 |
| 2,195,873 | Lord et al. | Apr. 2, 1940 |
| 2,248,869 | Hardwick | July 8, 1941 |
| 2,258,328 | Lee et al. | Oct. 7, 1941 |
| 2,383,645 | Hahn | Aug. 28, 1945 |

FOREIGN PATENTS

| Number | Country | Date |
|---|---|---|
| 139,321 | Austria | June 15, 1934 |

OTHER REFERENCES

Ser. No. 327,769, Wilfert (A. P. C.), published May 25, 1943.